United States Patent [19]

Grélat et al.

[11] Patent Number: 4,699,735

[45] Date of Patent: Oct. 13, 1987

[54] PROCESS FOR THE PREPARATION OF 1,4-DIAMINOANTHRAQUINONE-2-SULFONIC ACID

[75] Inventors: Maurice Grélat, Melide; Rudolf Schaulin, Riehen, both of Switzerland

[73] Assignee: Ciba-Geigy Corporation, Ardsley, N.Y.

[21] Appl. No.: 818,449

[22] Filed: Jan. 13, 1986

[30] Foreign Application Priority Data

Jan. 24, 1985 [CH] Switzerland ............................ 315/85

[51] Int. Cl.$^4$ ......................................... C07C 143/665
[52] U.S. Cl. .................................................. 260/371
[58] Field of Search ......................................... 260/371

[56] References Cited

U.S. PATENT DOCUMENTS 2,581,016 1/1952 Grossmann ........................ 260/371
2,842,564 7/1958 Bloom et al. ....................... 260/371

FOREIGN PATENT DOCUMENTS 1212846 11/1970 United Kingdom ................ 260/371

OTHER PUBLICATIONS

Houben-Weyl, vol. 7, Teil 3c, (1979) O. Bayer: Anthrachinone p. 192.
Houben-Weyl, vol. 7, 7/3C, O. Bayer Anthrachionone p. 178.
O. Bayer; Anthrachinone—pp. 164–165.
Sulfonation and Related Reactions, Everett E. Gilbert, (1965), Interscience Monographs on Chemistry, Inorganic Chemistry Section pp. 6–19.
Chemical Abstract 41-Dyes vol. 96, (1983) p. 85 #8148g 7/21/81.
Chemical Abstracts vol. 97, (1982) Appl. 80/138,504 #127,301g.
26 Condensed Aromatics vol. 86, (1977) Appl. 75/83,954 #171143d.
Chemical Abstracts vol. 97, (1982) Appl. 80/130,188 #198009d.
26-Condensed Aromatic Compounds vol. 71, (1969) Pol. 56,839 2/10/69.

*Primary Examiner*—Glennon H. Hollrah
*Assistant Examiner*—Raymond Covington
*Attorney, Agent, or Firm*—Edward McC. Roberts; Kevin T. Mansfield

[57] ABSTRACT

The invention relates to a process for the preparation of 1,4-diaminoanthraquinone-2-sulfonic acid by sulfonating 1,4-diaminoanthraquinone or leuco-1,4-diaminoanthraquinone, which comprises carrying out the sulfonation at elevated temperature with oleum as sulfonating agent, with or without the addition of a Lewis base. The 1,4-diaminoanthraquinone-2-sulfonic acid is used in particular for synthesizing anthraquinoid disperse dyes for dyeing hydrophobic fibre materials.

7 Claims, No Drawings

PROCESS FOR THE PREPARATION OF 1,4-DIAMINOANTHRAQUINONE-2-SULFONIC ACID

The invention relates to a process for the preparation of 1,4-diaminoanthraquinone-2-sulfonic acid starting from 1,4-diaminoanthraquinone or leuco-1,4-diaminoanthraquinone.

1,4-Diaminoanthraquinone-2-sulfonic acid is an important intermediate and is used e.g. for the synthesis of textile dyes. A number of processes for the preparation of this compound are described in the literature. For example, German Offenlegungsschrift No. 19 06 834 describes a multi-step process using 1-aminoanthraquinone-2-sulfonic acid as starting material. First a protective group is introduced at the amino nitrogen of the 1-aminoanthraquinonesulfonic acid, then the sulfonic acid is nitrated in the 4-position, and finally the protective group is removed and the 4-nitro group is reduced to the amino group.

Further, Polish Pat. No. 56.839 teaches a method by means of which 1,4-diaminoanthraquinone-2-sulfonic acid is obtained in a yield of 60% from 1-aminoanthraquinone-4-sulfamic acid by thermal rearrangement.

Processes for the preparation of 1,4-diaminoanthraquinone-2-sulfonic acid by direct sulfonation of 1,4-diaminoanthraquinone using chlorosulfonic acid as sulfonating agent, in di- or trichlorobenzene as reaction medium, are also known (q.v. Japanese patent applications Nos. 75/83.954; 79/168.975; 80/138.504/; 80/130.188). The drawback of these processes is that the organic solvent has to be recycled and, after repeated use, gives rise to disposal problems, as often happens with chlorinated hydrocarbons.

The preparation of 1,4-diaminoanthraquinone-2-sulfonic acid by sulfonation in oleum is in principle not recommended owing to the sensitivity to hydrolysis of the substituents (q.v. Houben-Weyl, Vol. 7, Part 3c, page 192 (1979). Mention is also made in this reference of the fact that 1,4-diaminoanthraquinone is converted in oleum, with good yield, into the cyclic 1,9;4,10-bis-sulfimide ester.

Finally, 1,4-diaminoanthraquinone-2-sulfonic acid can also be obtained via bromamine acid (q.v. Houben-Weyl, Vol. 7/3c, page 178 [1979]). Although this process affords a good yield of pure product, it is fairly complicated, as it is carried out with liquid ammonia under pressure.

Hence it is the object of the present invention to provide a process which is simple to carry out, i.e. no multi-step synthesis and no operation requiring complicated apparatus, and which also affords the desired product in high yield, without having to use solvents which are difficult to dispose of.

Surprisingly, it has now been found that 1,4-diaminoanthraquinone can be converted by treatment with oleum into 1,4-diaminoanthraquin-one-2-sulfonic acid in a yield of about 80%, with the optional additional use of a Lewis base to increase the yield, which base forms a complex with sulfur trioxide.

Accordingly, the present invention relates to a process for the preparation of 1,4-diaminoanthraquinone-2-sulfonic acid by sulfonating 1,4-diaminoanthraquinone or leuco-1,4-diaminoanthraquinone, which process comprises carrying out the sulfonation at elevated temperature with oleum as sulfonating agent, with or without the addition of a Lewis base.

The process can be easily carried out, does not require the use of an organic solvent, and affords 1,4-diaminoanthraquinone-2-sulfonic acid in good yield.

The starting 1,4-diaminoanthraquinone or leuco-1,4-diaminoanthraquinone is known and can be obtained e.g. by reacting dihydroquinizarine with ammonia [q.v. Houben-Weyl, Vol. 7/3c, page 164 (1979)].

The oleum employed in the process of this invention as sulfonating agent is preferably oleum having a concentration of 20 to 70% by weight. It is, of course, also possible to use concentrated sulfuric acid as reaction medium and then to add the requisite amount of sulfur trioxide. In principle, it is possible to charge the starting material to concentrated, preferably 100%, sulfuric acid, and then to add oleum or to charge the starting material direct to oleum. If the process is carried out in sulfuric acid, then conveniently 2 to 10, preferably 3 to 4, parts of concentrated sulfuric acid are used per 1 part of 1,4-diaminoanthraquinone or leuco-diaminoanthraquinone. Concentrated sulfuric acid will preferably be used, as it is necessary to bind the residual water by a corresponding excess of oleum. Regardless of whether the starting material is charged to sulfuric acid or direct to oleum, the concentration and amount of oleum shall be such that the reaction mixture, at the conclusion of the reaction, advantageously has a sulfur trioxide concentration of 10 to 30% by weight.

The reaction is conveniently carried out in the temperature range from 90° to 150° C., preferably from 100° to 130° C. At temperatures above 150° C., the formation of by-products increases sharply, whereas the reaction proceeds too slowly at temperatures below 90° C.

To increase the yield it is advantageous to carry out the reaction in the presence of a Lewis base. Lewis bases form with the sulfur trioxide of the oleum co-ordination compounds, so-called $SO_3$ adducts or complexes. The sulfur trioxide is continuously set free from these complexes during the reaction [q.v. E. E. Gilbert, Sulfonation and Related Reactions, Interscience Publishers (1965)]. Suitable Lewis bases are in particular: di- and trialkylamines containing 1 to 4 carbon atoms in the alkyl moieties, e.g. dimethylamine, diethylamine, dipropylamine, dibutylamine, trimethylamine, triethylamine, tripropylamine or tributylamine; also N-mono-or N,N-di($C_1$–$C_4$)alkylanilines such as methyl aniline, N-ethylaniline, N-propylaniline, N-butylaniline, N,N-dimethylaniline, N,N-diethylaniline, N,N-dipropylaniline or N,N-dibutylaniline, as well as pyridine, quinoline, morpholine or dioxane, each of which may be substituted for example by lower alkyl, for example 2-methylpyridine, 2,6-dimethylpyridine, N-ethylmorpholine; and also N,N-di($C_1$–$C_4$)alkylcarboxamides such as N,N-dimethylformamide, N,N-dimethylacetamide, N,N-diethylformamide or N,N-diethylacetamide; or also tri($C_1$–$C_4$alkyl)phosphates such as trimethylphosphate, triethylphosphate, tripropylphosphate or tributylphosphate. The preferred base is pyridine or dimethylformamide. The Lewis base is employed in an amount of 0.5 to 2 moles, based on 1 mole of 1,4-diaminoanthraquinone or leuco-1,4-diaminoanthraquinone. It is convenient to employ an approximately equimolar amount of Lewis base, based on the diamine.

After a reaction time of 2 to 20 hours the starting material is almost completely reacted and working up is commenced. This comprises first cooling the reaction mixture and either slowly adding water or ice at a temperature of about 70°–80° C. or cooling the reaction mixture to room temperature and then pouring it onto ice. Sufficient water or ice is added to dilute the reaction mixture to a sulfuric acid concentration of 40 to 80% by weight. Dilution causes the sulfonic acid to precipitate. The precipitate can then be isolated from the dilute sulfuric acid by conventional separating methods such as filtration or centrifugation. It is preferred to separate the crude sulfonic acid by filtration. The filter cake may be washed with dilute sulfuric acid or subsequently taken up in water, and the solution is adjusted to a pH of about 1–2 with alkali metal hydroxide solution, e.g. sodium hydroxide solution, and the product is again isolated by filtration.

To obtain substantially pure 1,4-diaminoanthraquinone-2-sulfonic acid with a low content of residual sulfuric acid it is expedient to dissolve the crude reaction product in an alkali metal hydroxide solution and to isolate the 1,4-diaminoanthraquinone-2-sulfonic acid from the weakly alkaline solution in the form of the magnesium salt after addition of a magnesium salt or of a magnesium ion donor. The advantage of this process is that the magnesium salt of 1,4-diaminoanthraquinone-2-sulfonic precipitates in readily filterable form from the weakly alkaline solution upon cooling and can be easily isolated by filtration and washed until neutral.

The magnesium salt of 1,4-diaminoanthraquinone-2-sulfonic acid can be converted into the free acid by known methods, for example by acidification or with an ion exchanger.

Suitable magnesium salts or magnesium ion donors are in particular water-soluble magnesium salts, e.g. magnesium chloride and, preferably, magnesium sulfate, as well as magnesium carbonate. The magnesium may also be used e.g. in complexed form.

The magnesium salt or magnesium ion donor is conveniently employed in equimolar amount with a 10 to 20% excess, based on 1,4-diaminoanthraquinone-2-sulfonic acid. The addition of the magnesium salt or magnesium salt solution is made with advantage in the temperature range from 70° to 110° C., preferably from 80° to 95° C.

The process for the preparation of 1,4-diaminoanthraquinone-2-sulfonic acid may for example be carried out as follows:

1,4-Diaminoanthraquinone or leuco-1,4-diaminoanthraquinone is charged to sulfuric acid, preferably 100% sulfuric acid (so-called monohydrate), to which has been added beforehand, or is added subsequently, an approximately equimolar amount, based on the diamine, of dimethylformamide or pyridine as Lewis base. The acid solution or suspension is then heated to a temperature in the range from 100°–120° C. and oleum is added in a concentration of 50 to 70%. The addition is made dropwise, conveniently such as to give rapidly a sufficiently high concentration of oleum at the start of the reaction by a faster rate of addition and, towards the end of the reaction, to maintain a minimum concentration of approximately 10 to 30% by weight of sulfur trioxide, based on the reaction mixture, by means of slow dropwise addition. The reaction time is from about 5 to 10 hours.

Before it is worked up, the reaction mixture is cooled and then poured onto ice. The quantity of ice is such that the reaction mixture, after dilution, has a sulfuric acid concentration of 60 to 70% by weight. The 1,4-diaminoanthraquinone-2-sulfonic acid is isolated by filtration from the resultant brown suspension and the moist acid-containing filter cake is then suspended in water. Then sodium or potassium hydroxide solution is added until the pH is about 8–9, whereupon the readily water-soluble sodium or potassium salt of 1,4-diaminoanthraquinone-2-sulfonic acid forms. The resultant blue solution may be clarified by filtration. The pH of the solution is then made weakly alkaline (c. pH 7–8) and, with heating, a somewhat more than equimolar amount (~10% excess), based on the 1,4-diaminoanthraquinone-2-sulfonic acid, of magnesium salt, e.g. magnesium sulfate, is added. The magnesium salt of 1,4-diaminoanthraquinone-2-sulfonic acid precipitates in crystalline form from the solution upon cooling and is isolated by filtration, washed with an aqueous solution of magnesium salt, e.g. with an approximately 3% solution of magnesium sulfate, and dried. The yield is about 85–90%.

The magnesium salt of 1,4-diaminoanthraquinone-2-sulfonic acid can be used direct as obtained for the dye synthesis.

The 1,4-diaminoanthraquinone-2-sulfonic acid, as free acid or magnesium salt, is used in particular for the synthesis of anthraquinoid disperse dyes which are especially suitable for dyeing hydrophobic fibre materials, e.g. polyester.

The invention is illustrated by the following Examples in which parts and percentages are by weight. Kieselgur plates with UV indicator are used for analysis of the product by thin-layer chromatography. Composition of the eluant: 138 ml of amyl alcohol, 105 ml of methanol, 90 ml of benzene, 36 ml of water and 30 ml of 25% ammonia.

EXAMPLE 1

80 parts of leuco-1,4-diaminoanthraquinone are added to 270 parts of 100% sulfuric acid over 30 minutes, the temperature rising to 65°–70° C. The solution is heated to 110° C. and then 90 parts of 66% oleum are added initially over 1 hour, followed by the dropwise addition of a further 80 parts of 66% oleum over the next 3 hours. The reaction mixture is then stirred for a further 4 hours at 110° C., cooled to room temperature and poured onto 255 parts of ice. The resultant brown suspension is filtered at room temperature, affording crude 1,4-diaminoanthraquinone-2-sulfonic acid which still contains sulfuric acid and is of sufficient purity that it can be used in this form direct for the dye synthesis, especially if the subsequent synthesis is carried out in sulfuric acid in any case.

To obtain an acid-free, readily filterable final product, an additional processing step is carried out, which comprises suspending the acid filter cake in water and adjusting the pH of the aqueous suspension to 8.5 with 35% sodium hydroxide solution. The resultant blue solution is heated to 85° C. and clarified by filtration. The pH of the solution is adjusted to 7.5 and 70 parts of magnesium sulfate are added to the hot solution of 85°–90° C. Upon cooling the reaction solution, the product crystallises as magnesium salt, which is isolated by filtration, washed with a 3% solution of magnesium sulfate and dried. According to analysis by thin-layer chromatography, the product is homogeneous with $R_f=0.56$. The yield is c. 80%.

EXAMPLE 2

The procedure of Example 1 is repeated, except that 30 parts of dimethylformamide are added before the addition of leuco-1,4-diaminoanthraquinone. 97.8 parts of the magnesium salt of 1,4-diaminoanthraquinone-2-sulfonic acid are obtained, corresponding to a yield of 87%.

EXAMPLE 3

60 parts of 1,4-diaminoanthraquinone are added to 228 parts of 25% oleum over one hour and then 20 parts of pyridine are added. The temperature of the reaction mixture is 70°–80° C. and is further raised to 120° C. The reaction mixture is stirred at this temperature for 3 hours, then cooled to 70°–80° C., and 220 parts of water are slowly added dropwise. The resultant thick suspension is filtered at room temperature and the filter cake is washed with 100 parts of 50% sulfuric acid and subsequently dispersed in water. The pH of the aqueous suspension is then adjusted to 7.5 with 35% sodium hydroxide solution, whereupon the 1,4-diaminoanthraquinone-2sulfonic acid goes into solution. The solution is then heated to 85°–90° C. and 40 parts of magnesium sulfate are added. Upon cooling the reaction solution, the 1,4-diaminoanthraquinone-2-sulfonic acid crystallises in the form of the magnesium salt, which is isolated by filtration, washed with a 5% solution of magnesium sulfate and dried, affording 72.4 parts of the magnesium salt of 1,4-diaminoanthraquinone-2-sulfonic acid, corresponding to a yield of 85%. According to chromatographic analysis, the product is homogeneous with a trace of starting material. The $R_f$ value is 0.57, which confirms that this product is identical with that obtained in Example 1.

What is claimed is:

1. A process for the preparation of 1,4-diaminoanthraquinone-2-sulphonic acid by sulphonating 1,4-diaminoanthraquinone or leuco-1,4-diaminoanthraquinone, which comprises carrying out the sulphonation in a temperature range from 90° to 150° C. with oleum having a concentration of 20 to 70% as sulphonating agent in the absence of an insert organic solvent, where oleum is used in a concentration and amount such that the concentration of sulphur trioxide in the reaction mixture at the conclusion of reaction is between 10 and 30% by weight.

2. A process according to claim 1, wherein the reaction is carried out in the temperature range from 90° to 150° C., in particular from 100° to 130° C.

3. A process according to claim 1, wherein the reaction is carried out in the presence of a Lewis base.

4. A process according to claim 3, wherein the Lewis base employed is a di- or tri($C_1$–$C_4$)alkylamine, an N-mono- or N,N-di($C_1$–$C_4$)alkylaniline pyridine quinoline morpholine dioxane an N,N-di($C_1$–$C_4$)alkylcarboxamide or a tri($C_1$–$C_4$)alkylphosphate.

5. A process according to claim 4, wherein the Lewis base is pyridine or dimethylformamide.

6. A process according to claim 3, wherein the Lewis base is employed in equimolar amount, based on 1,4-diaminoanthraquinone or leuco-1,4-diaminoanthraquinone.

7. A process according to claim 1, wherein the 1,4-diaminoanthraquinone-2-sulfonic acid is isolated in the form of the magnesium salt.

* * * * *